(12) United States Patent
Rakshit et al.

(10) Patent No.: US 11,302,208 B2
(45) Date of Patent: Apr. 12, 2022

(54) DYNAMICALLY PROVIDING VIDEO CHECKPOINT QUESTIONS TO COUNTER VIEWER DISTRACTION EVENTS

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); John M. Ganci, Jr., Raleigh, NC (US); James E. Bostick, Cedar Park, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 699 days.

(21) Appl. No.: 16/152,857

(22) Filed: Oct. 5, 2018

(65) Prior Publication Data
US 2020/0111380 A1 Apr. 9, 2020

(51) Int. Cl.
*G09B 7/08* (2006.01)
*G06V 20/40* (2022.01)

(52) U.S. Cl.
CPC .............. *G09B 7/08* (2013.01); *G06V 20/41* (2022.01); *G06V 20/44* (2022.01)

(58) Field of Classification Search
CPC ....................................................... G09B 7/08
USPC ........................................................ 434/362
See application file for complete search history.

(56) References Cited

U.S. PATENT DOCUMENTS

| 6,745,170 | B2 | 6/2004 | Bertrand et al. | |
|---|---|---|---|---|
| 8,475,174 | B2 | 7/2013 | Ho et al. | |
| 9,764,243 | B2 | 9/2017 | Bostick et al. | |
| 2005/0026131 | A1 | 2/2005 | Elzinga et al. | |
| 2011/0177480 | A1* | 7/2011 | Menon | G09B 7/00 434/238 |
| 2012/0237920 | A1* | 9/2012 | Ho | G09B 5/06 434/362 |
| 2018/0075770 | A1* | 3/2018 | Falash | G07F 17/0014 |
| 2018/0241882 | A1* | 8/2018 | Lee | H04M 3/567 |
| 2019/0335006 | A1* | 10/2019 | George | G06N 20/10 |

OTHER PUBLICATIONS

Shin et al., "Understanding the Effect of In-Video Prompting on Learners and Instructors", Proceedings of the 2018 CHI Conference on Human Factors in Computing Systems, Paper No. 319, ACM, Apr. 21-26, 2018, Montreal, QC, Canada, 12 pages.

* cited by examiner

*Primary Examiner* — Daniel T Tekle
(74) *Attorney, Agent, or Firm* — Nicholas Bowman; Andrew D. Wright; Roberts Calderon Safran & Cole, P.C.

(57) ABSTRACT

Systems and methods for dynamically providing video checkpoint questions to counter viewer distraction events are disclosed. In embodiments, a method includes: initiating, by a computing device, a viewing session of a video module at a user computer system; determining, by the computing device, a distraction event with respect to a viewer of the video module during the viewing session, wherein the distraction event is associated with content at a distraction point in the video module; dynamically generating, by the computing device, a checkpoint question for the viewer based on the content at the distraction point in the video module and in response to the determining the distraction event; and presenting, by the computing device, the checkpoint question to the viewer during the viewing session.

18 Claims, 5 Drawing Sheets ial video. In embodiments, a system for providing online educational modules (e.g., educational videos) to viewers utilizes cognitive methods to generate dynamic checkpoint questions in real-time, wherein the checkpoint questions are tailored to the observed and predicted distraction level of each viewer. In aspects, when a viewer starts to get distracted from watching a video, or has historically become distracted at a related point in similar videos, the system dynamically forms checkpoint questions and presents these to the viewer, thus bringing the viewer's attention back to the video.

DYNAMICALLY PROVIDING VIDEO CHECKPOINT QUESTIONS TO COUNTER VIEWER DISTRACTION EVENTS

BACKGROUND

The present invention relates generally to providing educational videos to users and, more particularly, to dynamically providing checkpoint questions to counter observed and predicted distraction events during the viewing of an educational video.

Online video education is a rapidly growing area of education. Online video education systems often make use of statically defined checkpoint questions to assess how well a viewer has been paying attention to an educational module (e.g., an educational video). For example, at certain pre-defined points in a video, a checkpoint question may be posed to a viewer and must be answered correctly for the viewer to proceed with the viewing of the video. These pre-defined questions are static. Typically, such questions are the same for every viewer of the video, and are generally presented at the same time during every video playback.

SUMMARY

In an aspect of the invention, a computer-implemented method includes: initiating, by a computing device, a viewing session of a video module at a user computer system; determining, by the computing device, a distraction event with respect to a viewer of the video module during the viewing session, wherein the distraction event is associated with content at a distraction point in the video module; dynamically generating, by the computing device, a checkpoint question for the viewer based on the content at the distraction point in the video module and in response to the determining the distraction event; and presenting, by the computing device, the checkpoint question to the viewer during the viewing session.

In another aspect of the invention, there is a computer program product including a computer readable storage medium having program instructions embodied therewith. The program instructions are executable by a computing device to cause the computing device to: generate a distraction profile for a viewer based on an analysis of a history of video watching of the viewer; initiate a viewing session of a video module at a user computer system; determine content and context of the video module; determine one or more distraction points in the video module where the viewer is likely to become distracted based on a comparison of the distraction profile and the content and context of the video module; and present one or more checkpoint questions to the viewer during in the viewing session, wherein the one or more checkpoint questions are configured to assist the viewer in staying focused on the video module during the viewing session.

In another aspect of the invention, there is a system including: a processor, a computer readable memory and a computer readable storage medium associated with a computing device; program instructions to initiate a viewing session of a video module at a user computer system; program instructions to determine a distraction event with respect to a viewer of the video module during the viewing session, wherein the distraction event is associated with a portion of the video module; program instructions to classify, during the viewing session, the portion of the video module based on content and context of the portion of the video module; program instructions to dynamically generate a checkpoint question for the viewer based on the classifying; and program instructions to present the checkpoint question to the viewer during the viewing session, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
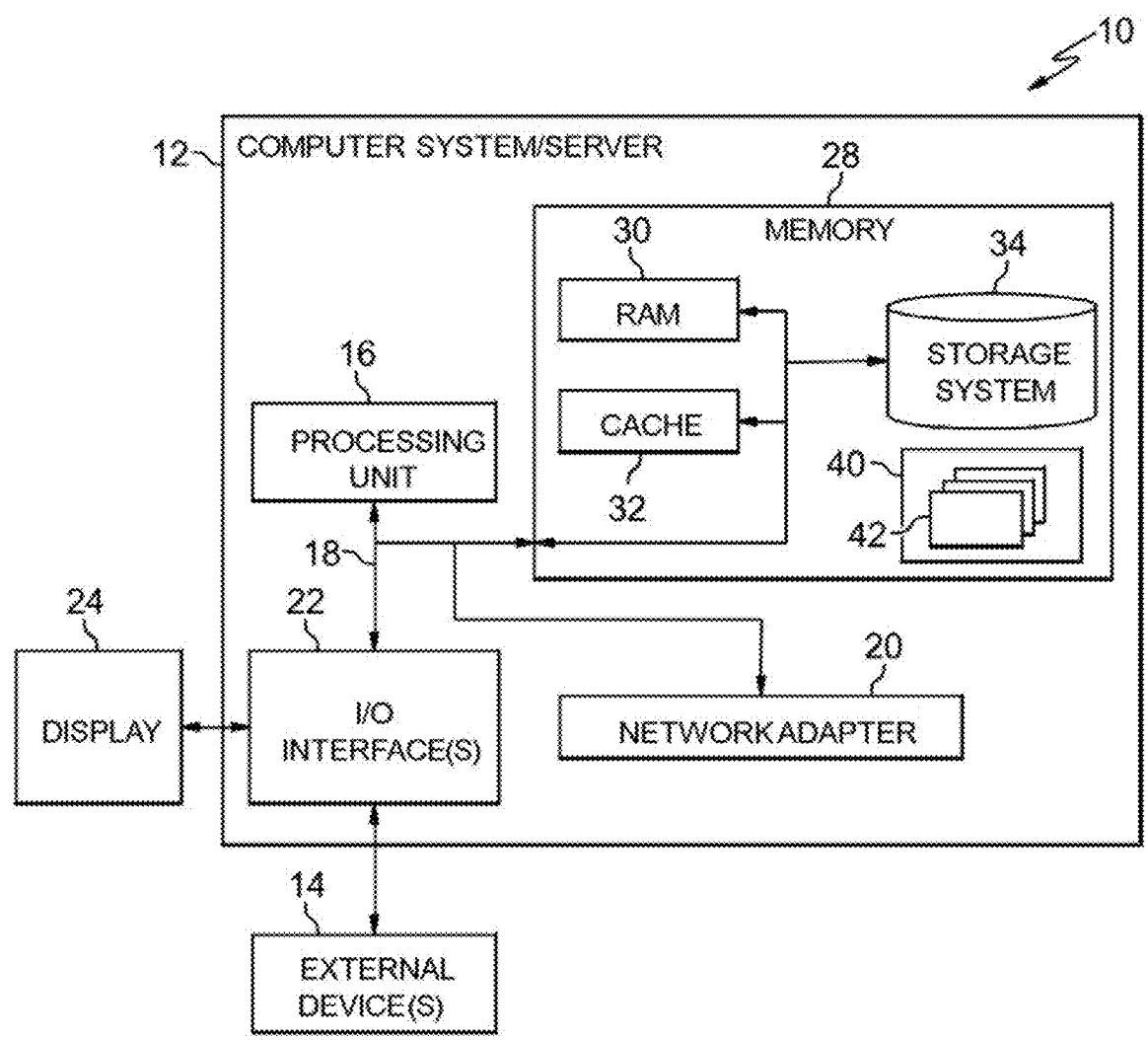
FIG. 1 depicts a computing infrastructure according to an embodiment of the present invention.

The present invention relates generally to providing educational videos to users and, more particularly, to dynamically providing checkpoint questions to counter observed and predicted distraction events during the viewing of an educational video. In embodiments, a system for providing online educational modules (e.g., educational videos) to viewers utilizes cognitive methods to generate dynamic checkpoint questions in real-time, wherein the checkpoint questions are tailored to the observed and predicted distraction level of each viewer. In aspects, when a viewer starts to get distracted from watching a video, or has historically become distracted at a related point in similar videos, the system dynamically forms checkpoint questions and presents these to the viewer, thus bringing the viewer's attention back to the video.

Existing solutions for monitoring a viewer's attention level are not tailored to a user's personal playback experience. Typically, standard checkpoint questions are generated by a course creator in advance of viewing, and are presented at predefined intervals within an educational video. Advantageously, embodiments of the present invention utilize cognitive analysis to increase a viewer's attention on a video by generating checkpoint questions dynamically and rendering them for a viewer at a time when the viewer most needs to maintain attention. Thus, embodiments of the invention provide a technical solution to the problem of generating and presenting checkpoint questions in a digital product (e.g., educational video). In aspects, improvements to the function of a content providing system are realized through the use of unconventional cognitive analysis steps utilizing aggregate user distraction data and historic user-specific distraction data. Embodiments of the invention constitute technical improvements in the field of digital video systems by enabling such systems to dynamically generate checkpoint questions customized for a viewer based on real-time feedback, and render the checkpoint questions to the viewer in real-time.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
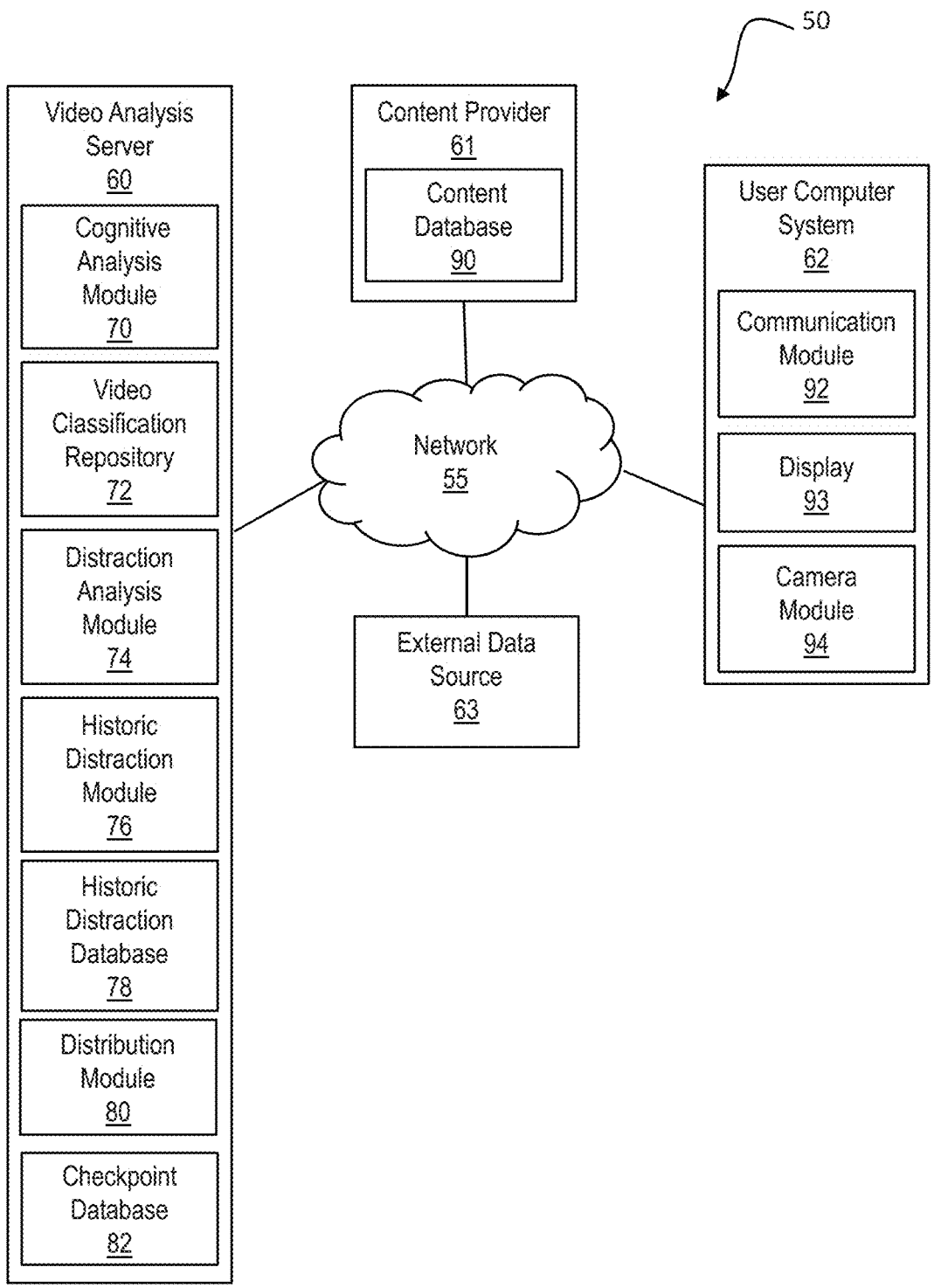
FIG. 2 shows an exemplary environment in accordance with aspects of the invention.

FIG. 2 shows an exemplary video distribution environment 50 in accordance with aspects of the invention. The video distribution environment 50 includes a network 55 enabling communication between a video analysis server 60, one or more content providers 61 (e.g., digital video providers), one or more user computer systems 62, and one or more external data sources 63 (e.g., test result providers, social media data providers, etc.). In aspects, the video analysis server 60 comprises the computer system 12 of FIG. 1, and is connected to the network 55 via the network adapter 20 of FIG. 1. In embodiments, the video analysis server 60 is configured as a special purpose computing device that is part of a digital video distribution system. For example, the video analysis server 60 may be specifically configured to provide educational videos to one or more local or remote clients. In embodiments, the video analysis server 60 is a cloud-based server in communication with a plurality of clients (e.g., user computer systems 62) via the network 55 (e.g., the Internet).

The network 55 may be any suitable communication network or combination of networks, such as a local area network (LAN), a general wide area network (WAN), and/or a public network (e.g., the Internet). The user computer system 62 may comprise components of the computing device 12 of FIG. 1, and may be a desktop computer, laptop computer, tablet computer, smartphone, or other type of personal computing device. In embodiments, the user computer system 62 runs a browser application program that provides an interface (e.g., a web page) by which a user may view video content (e.g., educational video modules) provided by the video analysis server 60. The video analysis server 60 may be configured to communicate with plural different user computer systems 62 simultaneously, and distribute videos separately to each user computer system 62 independent of the others.

Still referring to FIG. 2, the video analysis server 60 includes one or more program modules (e.g., program module 42 of FIG. 1) executed by the video analysis server 60, which are configured to perform one or more of the functions described herein. In embodiments, a cognitive analysis module 70 of the video analysis server 60 is configured to analyze a video for content and context. The term video as used herein refers to a digital video module which may include image data, sound data, and other associated data (e.g., metadata). In aspects, the cognitive analysis module 70 is configured to generate classification data and associated timestamp data for portions of the video based on the analysis, and save the data in a video classification repository 72.

In embodiments, a distraction analysis module 74 of the video analysis server 60 is configured to received user feedback (e.g., real-time user feedback) from a viewer of a video presented to the user by the video analysis server 60, and determine actual or predicted distraction events based the user feedback, user profile data stored in the distraction analysis module 74, and/or historic user distraction data in a historic distraction database 78.

In embodiments, a historic distraction module 76 of the video analysis server 60 is configured to generate historic distraction data for a user based on historic video playback events and/or data from external data sources (e.g., external data source 63), and save the historic distraction data in the historic distraction database 78. In aspects, the historic distraction module 76 is configure to generate aggregate user distraction data based on data from the historic distraction database 78.

Still referring to FIG. 2, in embodiments, a distribution module 80 of the video analysis server 60 is configured to: receive a request from a user to initiate a video event; initiate presentation of the video to the user; receive user feedback data from the user in real-time; and utilizing input from the distraction analysis module 74, determine a distraction event (e.g., an actual distraction event or a predicted distraction event). In aspects, the distribution module 80 determines content of a portion of the video associated with the distraction event (i.e., a distraction point in the video); initiates a pausing of the video; and presents a generated or retrieved checkpoint question to the user. In embodiments, the distribution module 80 receives a user request to re-play a portion of the video and initiates playback accordingly. In aspects, the distribution module 80 receives a response to the checkpoint question and determines the accuracy of the response before either continuing the video if the response is correct, or sending a notification that the response is not correct. In embodiments, the distribution module 80 dynamically generates the checkpoint questions during the viewing of the video, and saves the checkpoint questions in a checkpoint database 82 for use in future similar events.

In aspects of the invention, the content provider 61 provides content (e.g., digital video content) to the cognitive analysis module 70 of the video analysis server 60, such as from a content database 90. The content provider 61 may include components of the computing device 12, and may be a local or remote (e.g., cloud-based) source of content.

In embodiments, the distribution module 80 of the video analysis server 60 provides video modules to the user computer system 62 (via the network 55) through a communication module 92 of the user computer system 62 for displaying on a display 93. The display 93 may be a computer monitor, a television screen, or a touchscreen, for example. In aspects, the user computer system 62 includes a camera module 94 configured to generate image data of the user and provide the image data to the distraction analysis module 74 via the network 55. For example, the camera module 94 may include a digital video camera configure to record facial expressions of the user, wherein the recorded facial expressions of the user are fed to the distraction analysis module 74 via the network 55 for real-time analysis during a video module viewing session according to embodiments of the invention.

In embodiments, the video distribution environment 50 may include additional or fewer components than those shown in FIG. 2. In embodiments, separate components may be integrated into a single computing component or module. Additionally, or alternatively, a single component may be implemented as multiple computing components or modules. Moreover, the quantity of devices and/or networks in the video distribution environment 50 is not limited to what is shown in FIG. 2. In practice, the video distribution environment 50 may include additional devices and/or networks; fewer devices and/or networks; different devices and/or networks; or differently arranged devices and/or networks than illustrated in FIG. 2.

Figure 3:
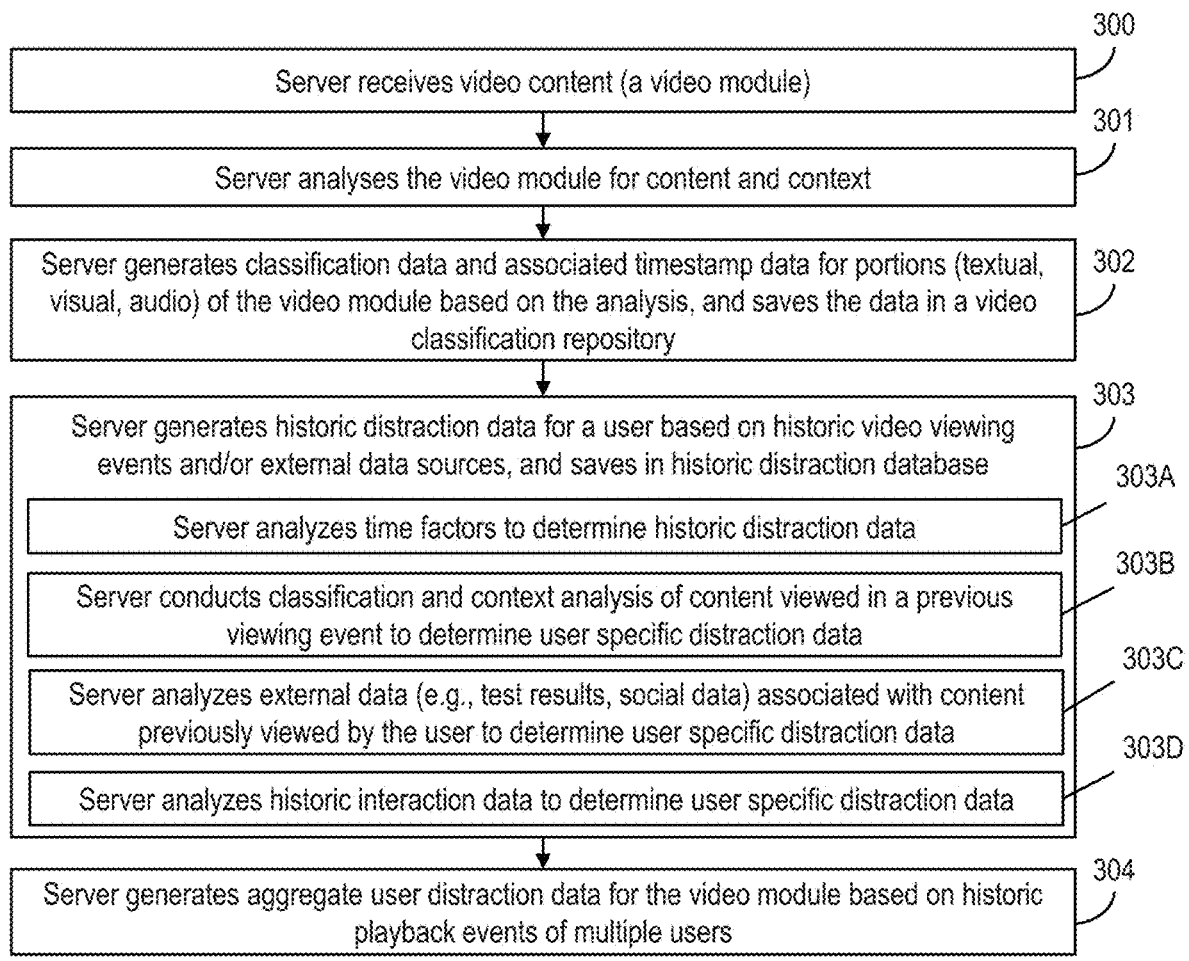
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the video analysis server 60 receives video content (hereafter "the video module"), from a content provider 61. It should be understood that the term "video module" as used herein refers to a collection of data in the form of video data, audio data, metadata, text-based data and/or other data for use in providing an educational experience to a viewer. In aspects, the video analysis server 60 receives the video module from the content database 90 of the content provider 61 via the network 55. In aspects, the video analysis server 60 is a cloud-based server receiving the video module from an educational video producer or a video distributor.

At step 301, the video analysis server 60 analyzes the video module for content and context. Various image, text and audio analysis tools may be utilized by the video analysis server 60 in the performance of step 301. In aspects, the video analysis server 60 utilizes one or more of the following: natural language processing (NLP) tools to analyze written content in the video; visual recognition tools for analyzing visual (image) content in the video such as diagrams, pictures, video clips, and the like; and speech to text tools for converting spoken narration in the video module into a textual transcript (which may then be passed to the NLP tools for analysis). In aspects, the cognitive analysis module 70 of the video analysis server 60 implements step 301.

At step 302, the video analysis server 60 generates classification data and associated timestamp data for portions of the video module (e.g., video scenes, graphs, or other portions of the video module) based on the analysis of step 301. In aspects, the video analysis server 60 saves the classification data, along with timestamp data for the respective classified portions of the video module, in the video classification repository 72. In aspects, the video analysis server 60 derives classification data for a video module based on what a given piece of text, visual diagram, or spoken word(s) relates to. In aspects, the cognitive analysis module 70 implements step 302. It should be understood that step 302 may be performed before or during a viewing session of the video module.

At step 303, the video analysis server 60 generates historic distraction data for a user based on historic video viewing events and/or external data sources 63 related to the user. In aspects, the video analysis server 60 saves the historic distraction data in a distraction profile for the user in the historic distraction database 78. In embodiments, the historic distraction module 76 of the video analysis server 60 implements step 303. A variety of historic distraction data types may be generated by the video analysis server 60 and saved in the historic distraction database 78. The term historic distraction data as used herein refers to data indicating when the attention of a user has wandered from content associated with a video module (e.g., an educational video module), or has otherwise been distracted from an intended user focus target (e.g., portions of the video module). A variety of techniques may be utilized by the video analysis server 60 in the implementation of step 303, as is demonstrated by exemplary steps 303A-303D discussed below.

At step 303A, the video analysis server 60 analyzes time factors to determine historic distraction data for a user. Time factors may include video module playback duration data, such as how long a user's attention span usually lasts in general, or how a user's attention span changes based on day, time of day, time of year, or based on other time or schedule-related factors.

At step 303B, the video analysis server 60 conducts classification and context analysis of content viewed by a user in a previous video viewing event in order to determine user specific distraction data (classification match data). In embodiments, classification match data includes data related to context and/or content associated with users-specific distraction events. Classification match data may relate to specific topics of a video module, or may related to aspects of the video module such as style of the video module, layout of content within the video module, or other data classified by the video analysis server 60.

At step 303C, the video analysis server 60 analyzes external data (e.g., user test results, social data, etc.) associated with content previously viewed by the user to determine user specific distraction data. In aspects, the video analysis server 60 is authorized to access various sources of user data, such as test result data, social media data, calendar data, email data, etc. In embodiments, the video analysis server 60 analyzes the user data for content and context, using for example, NLP tools or other cognitive tools. In implementations, the video analysis server 60 utilizes the user data to form a user profile for a user/viewer, which may be utilized in determining distraction related information for the user. For example, test results may indicate that the user's understanding of Topic X is imperfect, even though the user previously viewed a video module on Topic X. Accordingly, the video analysis server 60 may infer that the user experienced a distraction event regarding the Topic X during the viewing of the video module, and may flag the Topic X as content that is likely to cause a distraction event for the user in the historic distraction database 78.

At step 303D, the video analysis server 60 analyzes historic interaction data to determine user specific distraction data. In aspects, historic interaction data includes data (e.g., textual, audio, or visual) regarding a user's interaction with other user's and with applications of the user computer system 62 not associated with a viewing session of a video module. For example, historic interaction data may include data regarding the user: speaking with other users during a viewing session; texting with other users during a viewing session; interacting with social media, email, calendar, or other applications during a viewing session; or performing a variety of interactions during the viewing session not directly related to the viewing session.

It should be understood that steps 303A-303D may be combined, such that a variety of information may be utilized by the historic distraction module 76 in determining a user distraction profile. For example, the historic distraction module 76 may utilize a combination of time factors and external data to determine that a user who is watching a long video module before a scheduled (calendared) vacation is likely to be distracted 20 minutes into the video module.

At step 304, the video analysis server 60 generates aggregate user distraction data for a video module (video module of interest) based on historic viewing events of multiple users. In embodiments, the video analysis server 60 accesses historic distraction data in the historic distraction database 78, wherein the historic distraction data comprises data regarding distraction events of multiple users within the video distribution environment 50. For example, the video analysis server 60 may determine from aggregate viewer data that viewers are more likely than not to be distracted during the presentation of a bullet point list at a particular point in an educational video module. In aspects, the distraction analysis module 74 implements step 304. In embodiments, the video analysis server 60 saves aggregate user distraction data in the historic distraction database 78 with associated data regarding the video module of interest. This may be in the form of a lookup table, for example.

Figure 4:
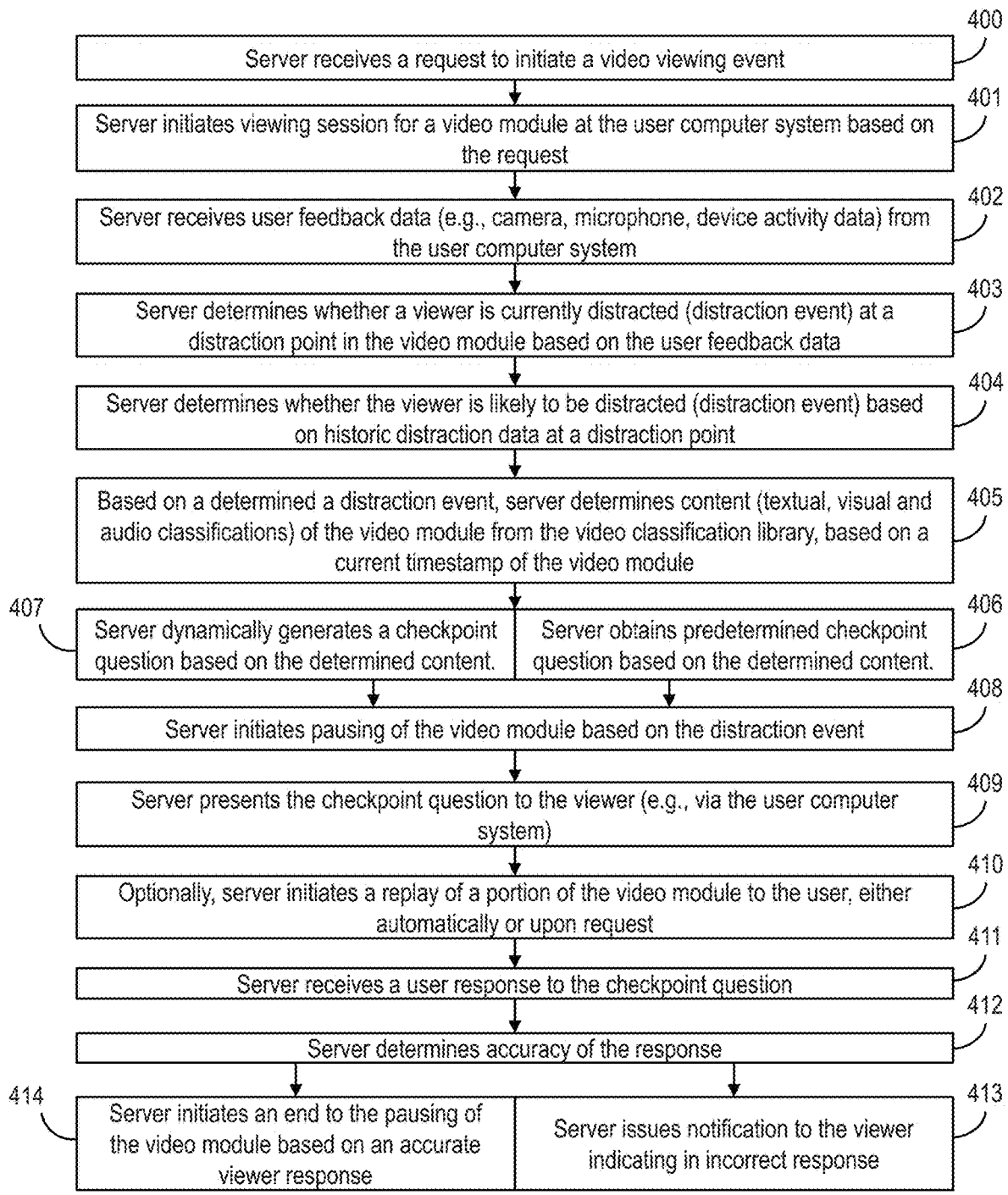
FIG. 4 shows a flowchart of steps of a method in accordance with aspects of the invention.

Turning to FIG. 4, a flowchart of a method in accordance with aspects of the invention is shown. Steps of the method of FIG. 4 may be performed in the environment illustrated in FIG. 2, and are described with reference to elements shown in FIG. 2.

At step 400, the video analysis server 60 receives a request to initiate a video module viewing event. In aspects, the video analysis server 60 receives the request directly from a user of the user computer system 62 via the network 55. The request may be in a variety of forms, including, for example, a user selection of an icon or hyperlink. In aspects, the request includes information identifying a video module to be viewed by a user. In aspects, the distribution module 80 of the video analysis server 60 receives the request in accordance with step 400.

At step 401, the video analysis server 60 initiates a viewing session for a video module at the user computer system 62 based on the request. In aspects, the video analysis server 60 identifies the video module to be presented to a user based on identifying information in the request received at step 400. A variety of methods may be utilized to initiate the viewing session. In aspects, the communications module 92 of the user computer system 62 receives streaming video module data from the video analysis server 60 in accordance with step 401, whereby the user can view the video module via the display 93 of the user computer system 62. In aspects, the distribution module 80 of the video analysis server 60 may implement step 401.

At step 402, the video analysis server 60 receives user feedback data (e.g., camera, microphone, device activity data) from the user computer system 62. In embodiments, the user feedback data is real-time data providing information regarding the user's real-time behavior or level of attention with respect to the video module playing during the viewing session. In aspects, the camera module 94 of the user computer system 62 provides captured image data of the user (user feedback data) to the video analysis server 60. In aspects, a microphone (not shown) associated with the user computer system 62 (e.g., directly or wirelessly connected therewith) provides audio information regarding the environment of the user (e.g., recorded voices, noises, etc.). In aspects, data regarding user activities may be sent from the user computer system 62 to the video analysis server 60 as user feedback data. For example, data collected from a global positioning system, accelerometers, gyroscopes or other sensors, and/or application usage data of the user computer system 62 may provide information regarding physical activities of the user with respect to the user computer system 62. In embodiments, the distraction analysis module 74 of the video analysis server 60 receives the user feedback data in accordance with step 402.

At step 403, the video analysis server 60 determines whether a user viewing the video module during the viewing session is currently distracted (at a distraction point in the video module), based on the user feedback data of step 402. The term distraction point as used herein refers to a point in the video module (e.g., a portion of the video module currently playing on the user computer system 62) at which a user is either actually distracted or is predicted to be distracted during the viewing session. The distraction point may be associated with a timestamp or range of timestamps of the video module, and with classification data determined according to step 302 of FIG. 3. In embodiments, the video analysis server 60 determines if a user is experiencing an actual distraction event based on real-time feedback data received in accordance with step 402. In aspects, the video analysis server 60 utilizes image analysis tools to determine that the user is distracted based on real-time user feedback data. For example, the video analysis server 60 may determine based on image data received from the camera module 94 of the user computer system 62 that the user's gaze has wandered from the display 93 (i.e., the user is not looking at the video module displayed to them). Historic user distraction data (e.g., stored in the historic distraction database 78) may be utilized by the video analysis server 60 in determining whether the user is experiencing an actual distraction event. For example, the video analysis server 60 may learn over time that the user can perform some types of multitasking behaviors successfully while still paying attention to a video module that is playing.

In embodiments, the video analysis server 60 utilizes user interaction data to determine that the user is currently distracted in accordance with step 403. In implementations, the video analysis server 60 may access, with permission, various applications of the user computer system 62 and receive data from the applications indicating when the user is performing functions not associated with the video module of a viewing session. For example, in embodiments, the video analysis server 60 receives user interaction data from the user computer system 62 indicating that the user is searching the Internet or checking email during a video module viewing session. In another example, the video analysis server 60 receives data from one of more sensors or applications (e.g., GPS, gyroscope, accelerometer, etc.) of a mobile user computer system (e.g., user computer system 62), whereby the video analysis server 60 determines that the user is moving or traveling in a manner that indicates the user is not paying attention to the video module playing during a viewing session. In aspects, the distraction analysis module 74 of the video analysis server 60 implements step 403.

At step 404, the video analysis server 60 determines whether a user is likely to be distracted based on historic distraction data. In embodiments, the video analysis server 60 accesses historic distraction data in the historic distraction database 78 and utilizes the data to predict that a distraction event is likely imminent for a viewer during a viewing session. In aspects, the video analysis server 60 accesses historic distraction data for the user, historic distraction data associated with the video module of the viewing session, and/or aggregate user distraction data. See, for example, the historic distraction data generated by the video analysis server 60 at steps 303 and 304 of FIG. 3. In aspects, the video analysis server 60 utilizes historic distraction data to analyze whether a user was distracted at a similar point in a given video based upon historical distraction analysis of other videos they have watched. For example, the video analysis server 60 may determine that a long bullet list in a current video module is similar to a long bullet list in a similar previously viewed video module, and may concluded that, based on the user's actual distraction during the viewing of the long bullet list in the similar video module, the user is likely to be distracted when viewing the long bullet list in the current video module. In embodiments, the distraction analysis module 74 of the video analysis server 60 implements step 404. In aspects, the video analysis server 60 determines that an upcoming portion of the video module of interest (i.e., a portion of the video module soon to be viewed by the user) is associated with one or more types of historic distraction data, wherein the user is likely to be distracted when the upcoming portion of the video module is played by the user computer system 62.

Various types of user distraction data may be analyzed by the video analysis server 60 in implementing step 404. In aspects, time related factors or video module playback duration data may be analyzed by the video analysis server 60 at step 404. In one example, a user may historically exhibit higher levels of distraction after a certain time period (e.g., maintaining interest for the first 5 minutes but usually becoming distracted with any video that lasts longer than 5 minutes). Playback duration data may be more granular to consider other factors, such as time of day (e.g., a user may typically have a threshold of 10 minutes before becoming distracted if watching a video module before 10:00 AM on a weekday).

In aspects, classification match data may be analyzed by the video analysis server 60 at step 404. Historically, certain topics or classifications observed in other videos watched by the user may typically lead to distractions. In one example, when a user has watched videos addressing a Topic X the user has consistently become distracted. In this example, if a currently watched video module is about to address or is addressing the same Topic X, the video analysis server 60 predicts that the user will become distracted again, in accordance with step 404. Additionally, the way a topic is presented may historically lead to distractions. In one example, the video analysis server 60 determines that, in past videos, the user is typically distracted if more than 3 slides in a row show only bulleted text and no diagrams. If the current video module has this same characteristic, the video analysis server 60 recognizes that the user is likely to become distracted in accordance with step 404.

In aspects, data from external sources may be utilized by the video analysis server 60 at step 404. External data sources can correlate to specific parts of an education component of a video module. For example, if a user is viewing an education video module regarding mathematics Topic X, and the user's recent quiz results (i.e., test result data from an external source) show poor results regarding Topic X, the video analysis server 60 may determine that the user is likely to be distracted from the Topic X in accordance with step 404. In embodiments, the video analysis server 60 accesses or mines education data (e.g., test results data) and/or social data of a user, and correlates the data with the video module of interest (i.e., the video module being viewed by the user in a viewing session). In aspects, cognitive processing engines of the video analysis server 60 may determine content and context of the data from external sources using one or more cognitive analysis techniques, and determines if there is a correlation between the content/context of the data and the content and/or context of one or more portions of the video module of interest.

In aspects, user interaction data may be utilized by the video analysis server 60 at step 404. Some users may multi-task without their attention to the video module of interest being negatively affected, while others cannot. Moreover, the effects of multi-tasking may be event specific. For example, a user may multi-task with Person A or on software ABC without their attention drifting substantially from a video module of interest, but may be significantly distracted form the video module when multi-tasking with Person B or software XYZ. In embodiments, the video analysis server 60 learns the impact of different types of multi-tasking events of a user (e.g., multi-tasking with different people or using different software), with respect to the user's ability to focus on a video module of interest. Accordingly, in embodiments, the video analysis server 60 determines that a user is likely to be distracted based on historically problematic multi-tasking events matching current multi-tasking event data for a user (e.g., the user is utilizing software XYZ and historically becomes distracted from a video module of interest when utilizing the software XYZ). In aspects, the video analysis server 60 utilizes aggregate historic distraction data to determine software and/or people that are likely to cause users, or a particular group of users, to be distracted. This aggregate data is then utilized by the video analysis server 60 in the implementation of step 404.

Still referring to FIG. 4, in aspects, aggregate distraction data for a video module may be utilized by the video analysis server 60 at step 404. In embodiments, the video analysis server 60 analyzes historic viewing session data for a given video in accordance with step 304 of FIG. 3 to determine one or more portions of the video (distraction points) that lead to user distractions over a predetermined baseline level. In embodiments, the video analysis server 60 at step 404 determines if a predetermined distraction-inducing portion or distraction point of the video of interest is playing or is about to be played, and thus determines that a distraction event is likely to occur.

At step 405, based on determining a distraction event has occurred (actual or predicted), the video analysis server 60 determines the content of the associated portion of the video module of interest from the video classification repository 72. In embodiments, the video analysis server 60 determines content of a portion (distraction point) of the video module that is being viewed, has just been viewed, or is about to be viewed, based on a current timestamp of the video module of interest. In implementations, the video analysis server 60 queries the video classification repository 72 to derive what content is currently being shown, or is about to be shown, during the viewing session, by looking up the current timestamp of the video module to retrieve the textual, visual, and audible classifications that were previously recorded for that portion of the video module (e.g., in accordance with step 302 of FIG. 3). In aspects, the distribution module 80 implements step 406 upon a determination at steps 404 or 405 of a distraction event.

In embodiments, at step 406, the video analysis server 60 obtains a predetermined checkpoint question from a database (e.g., checkpoint database 82) based on the content of the video module of interest determined at step 405. The term checkpoint question as used herein refers to content (e.g., text based, image based, audio based, or combinations thereof) configured to be presented to a user to induce a response from the user, wherein the response can be utilized to confirm that the user's attention is directed to at least a portion of the video module of interest. In aspects, the checkpoint question is in the form of a question that tests a user's knowledge of the content of the portion of the video module determined at step 405. For example, the checkpoint question may request that a user select from a plurality of possible correct answers, or fill in a blank with a correct answer to question. In one example, the video analysis server 60 determines at step 404 that an upcoming portion of the video module of interest is likely to be a point of distraction for a user based on historic distraction data, determines at step 405 that the upcoming portion of the video module of interest is directed to Topic X, and obtains a predetermined checkpoint question for the Topic X from the checkpoint database 82. Thus, in embodiments, the video analysis server 60 obtains a predetermined checkpoint question that is relevant to the portion of the video module the user is currently watching or is about to watch during a viewing session. In aspects, the distribution module 80 implements step 406. In embodiments, the predetermined checkpoint question is a checkpoint question previously dynamically created in accordance with step 407 discussed below.

In embodiments, at step 407, the video analysis server 60 dynamically generates a checkpoint question based on the content determined at step 405. In aspects, the video analysis server 60 generates one or more checkpoint questions based on classifications of a current or upcoming portion (distraction point) of the video module. Thus, embodiments of the invention enable dynamic generation in real-time of checkpoint questions relevant to the portion of the video module that the user is currently watching or is about to watch during a viewing session. In implementations, the video analysis server 60 dynamically generates both the checkpoint question and one or more acceptable answers to the checkpoint question. The checkpoint question may be in the form a multiple choice question, a fill in the blank question or other type of question. In aspects, the distribution module 80 implements step 407. In implementations, the video analysis server 60 dynamically generates both a checkpoint question and at least one correct answer, and saves the checkpoint question and at least one correct answer in the checkpoint database 82.

At step 408, the video analysis server 60 initiates a pausing of the video module based on a determined distraction event (actual or predicted). In aspects, the video analysis server 60 pauses the video module immediately before or after the portion of the video module associated with the distraction event (actual or predicted). Various methods of pausing the playing of a video module of interest at the user computer system 62 may be utilized in accordance with step 408. In aspects, the distribution module 80 implements step 409.

At step 409, the video analysis server 60 presents the checkpoint question of step 406 or step 407 to the user (e.g., via the user computer system 62). In embodiments, the checkpoint question (a predetermined static checkpoint question or a dynamically generated checkpoint question) is tailored to the portion of the video module where the distraction occurred (see step 403) or was predicted to occur (see step 404). In implementations, the video analysis server 60 presents the checkpoint question after the portion of the video module associated with the distraction event. In aspects, the distribution module 80 implements step 409.

At step 410, the video analysis server 60 optionally initiates a replay of a portion of the video module to the user, either automatically or based on a request from the user. In aspects, the video analysis server 60 receives a user request to replay a portion of the video module (e.g., the portion of the video module associated with the distraction event and the checkpoint question), and complies with the request. In one example, a user receives the checkpoint question in accordance with step 409, and is unsure of the answer because they were distracted during the portion of the video module to which the checkpoint question is directed. In this example, the user requests (e.g., through a selectable icon or other method) to rewind and/or playback the portion of the video module associated with the distraction event. In aspects, the video analysis server 60 enables a user to play back portions of the video module as desired (e.g., multiple times). In implementations, the video analysis server 60 automatically replays a portion of the video module of interest, such as when the video analysis server 60 determines that a user has responded incorrectly to the checkpoint question (see steps 412 and 413 of FIG. 4 below). In embodiments, the distribution module 80 implements step 410.

At step 411, the video analysis server 60 receives a user response to the checkpoint question presented at step 409. In aspects, the video analysis server 60 receives a user response through the communication module 92 of the user computer system 62. In implementations, the distribution module 80 receives the user response in accordance with step 411.

In aspects, at step 412, the video analysis server 60 determines the accuracy of the response received at step 411. In embodiments, the video analysis server 60 compares the user's response received at step 411 to predetermined acceptable responses (e.g., responses saved in the checkpoint database 82 in association with predefined static checkpoint questions, or responses dynamically generated at step 407). Alternatively, the video analysis server 60 simply acknowledges the receipt of a response at step 411 without confirming the accuracy of any response, such as when a checkpoint question is being utilized as a simple means for returning a user's attention to the video module. In implementations, the distribution module 80 implements step 412.

At step 413, upon determining that the response received at step 411 is incorrect at step 412, the video analysis server 60 issues a notification to the user indicating that the response received at step 411 is incorrect. This notification could take on a variety of forms, such as visual, textual or audio. In aspects, the video analysis server 60 issues a notification to the user computer system 62 to be displayed on the display 93 in accordance with step 413. In implementations, the video analysis server 60 sends a notification regarding the replaying of a portion of the video module (e.g., regarding the automatic replaying of a portion of the video module in accordance with step 410). In implementations, the distribution module 80 implements step 413.

At step 414, upon determining that the response received at step 412 is correct at step 412, the video analysis server 60 initiates an end to the pausing of the video module initiated at step 408. In implementations, the distribution module 80 implements step 414. It should be understood that steps 408-414 can be performed multiple times during a viewing session, and that various combinations of one or more of steps 408-413 may be implemented multiple consecutive times until the video analysis server 60 determines that an accurate response has been received and un-pauses the video module at step 414.

Figure 5:
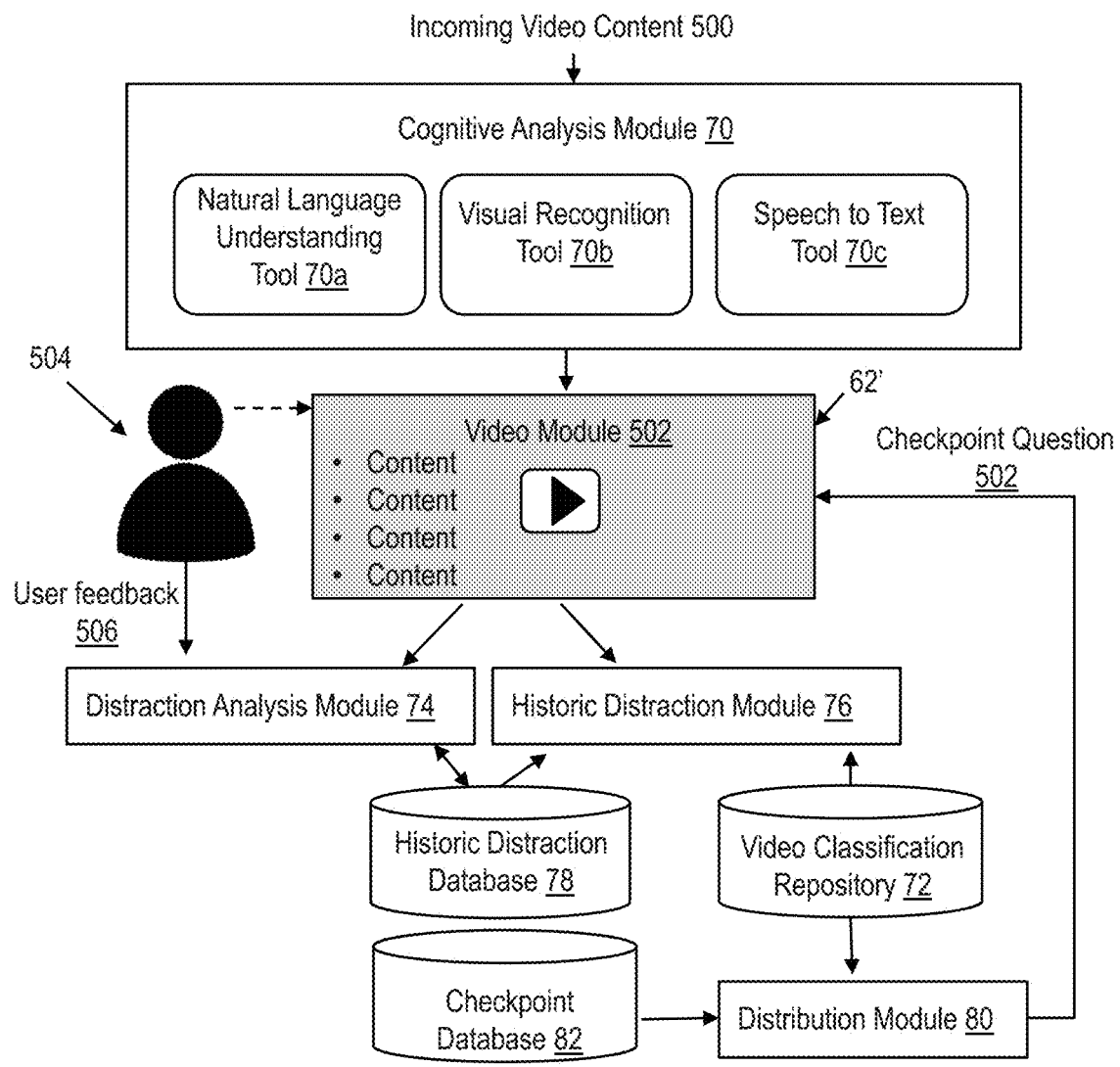
FIG. 5 shows a flow diagram in accordance with embodiments of the invention.

FIG. 5 illustrates an exemplary use scenario in accordance with embodiments of the invention. The scenario of FIG. 5 may be performed in the environment illustrated in FIG. 2, in accordance with the methods of FIGS. 3 and 4.

In the scenario of FIG. 5, the cognitive analysis module 70 of the video analysis server 60 of FIG. 2 utilizes a natural language understanding or natural language processing (NLP) tool 70a, a visual recognition tool 70b and a speech to text tool 70c to assign classification data to portions of incoming video module 500 in accordance with step 302 of FIG. 3. The video module 502 is presented to a viewer 504 in response to a request from the viewer, in accordance with steps 400 and 401 of FIG. 4. As the video module 502 plays, the video analysis server 60 (depicted in FIG. 1) analyzes the playing of the video module to determine three factors. First, the video analysis server 60 determines if the user is currently distracted at a given point in the playing of the video module. Second, the video analysis server 60 determines if the viewer 504 has been previously distracted at a portion of a video module that shares similar characteristics to the given point. Third, the video analysis server 60 determines if other users who have watched the video module 502 have been more distracted than the baseline level of user distraction at this same given point in the video module. In this example, real-time user feedback data 506 in the form of camera data, microphone data and device activity data, is received at the distraction analysis module 74 for analysis. In accordance with step 403 of FIG. 4, the distraction analysis module 74 determines that the viewer 504 is currently distracted (i.e., detects a distraction event) based on the real-time user feedback data 506.

In the example of FIG. 5, visual recognition tools of the distraction analysis module 74 are utilized to determine: where the viewer 504 is gazing (e.g., whether they are looking at the video module 502); and/or the facial expression of the viewer 504 (e.g., are they staring blankly at the video module 502, are they looking confused, are they looking attentive, etc.). Moreover, real-time audio data from a microphone (not shown) is utilized by the distraction analysis module 74 to determine if the viewer 504 is listening to audio of the video module or chatting with another person, or is listening in a distracting environment with a lot of other noises competing with the video module 502. Additionally, in this example, the distraction analysis module 74 receives device activity data from the user's computer system 62'. In this example, the device activity data indicates that the viewer 504 is scrolling through a social media feed while the video module 502 plays.

The historic distraction module 76 also accesses historic distraction data in the historic distraction database 78 to determine if the viewer 504 is likely to be distracted based on historic data of the user and historic data of other users (e.g., aggregate historic user data). Based on the viewer 504 scrolling through the social media feed, the distraction analysis module 74 determines that the viewer is likely to be distracted in real-time during the viewing of the video module 502. In accordance with step 405 of FIG. 4, the distribution module 80 determines the timestamp of the video module 502 and accessing the video classification repository 72 to determine content of the particular portion of the video module 502 associated with the timestamp. In the example of FIG. 5, the distribution module 80 determines that a static checkpoint question has already been generated for this portion of the video module 502, and is saved in the checkpoint database 82. The distribution module 80 obtains the predetermined checkpoint question from the checkpoint database 82 and provides it to the user after pausing the video module 502, in accordance with steps 404, 408 and 409 of FIG. 4. In this example, the checkpoint question comprises a question with multiple choice answers. The viewer 504 answers the question accurately, and the distribution module 80 causes the video module 502 to start playing again in accordance with steps 411, 412 and 414 of FIG. 4.

In this scenario, the system of the invention learns over time that the user is not actually distracted when scrolling through social media during the playing of a video module 502, and updates profile data of the user (e.g., from historic distraction database 78) utilized in the decision making of the system. In this example, data regarding the above-described distraction event is saved in the historic distraction module 76 for the viewer 504.

Based on the above, it can be understood that embodiments of the invention provide a system that that monitors when a user is distracted watching a video education module, classifies what was displayed during the portion of time the user was distracted, and dynamically generates checkpoint questions about this missed content to draw the user's attention back to the video. Moreover, in embodiments, a system predicts when a user is likely to become distracted based upon analysis of when a user has been distracted at points in similar videos that share characteristics with the currently played video. The system dynamically generates checkpoint questions about this content to keep the user's attention and prevent them from becoming distracted. Moreover, in embodiments, a system is provided that predicts when a user is likely to become distracted based upon analysis of aggregate users who have previously watched the same video. The system dynamically generates checkpoint questions about this content to keep the user's attention and prevent them from becoming distracted.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for dynamically providing checkpoint questions to counter observed and predicted distraction events. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In accordance with aspects described herein, implementations of the invention provide a method for using personalized, dynamic checkpoint questions within an educational video to help a viewer avoid being distracted form the content in the video. In particular, the method includes: generating, based on an analysis of a viewer's history of watching other videos, a distraction profile for that viewer, wherein the distraction profile indicates contextual situations (e.g., particular video topics, incoming phone calls from particular people, etc.) in which the user is likely to be distracted; performing, either while or before the viewer watches the video, a detailed analysis of the content of the video (e.g., determine where in the video certain topics are presented) and of the context in which the viewer is watching/will watch the video (e.g., determine that the user has a phone call scheduled to coincide with the 30 minute mark of the video); predicting, based on a comparison of the distraction profile to the detailed analysis, a plurality of distraction points in the video where the viewer is likely to become distracted; and inserting, at the distraction points, checkpoint questions about the video to help the viewer stay focused on the video. In embodiments, each inserted checkpoint question is dynamically generated based on an analysis of the content in the video immediately prior to the checkpoint (so that the questions are relevant).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
 initiating, by a computing device, a viewing session of a video module at a user computer system;
 determining, by the computing device, a distraction event with respect to a viewer of the video module during the viewing session at a distraction point in the video module;
 in response to determining the distraction event, determining, by the computing device, content associated with the distraction point in the video module based on timestamp data stored in a video classification repository;
 dynamically generating, by the computing device, a checkpoint question for the viewer based on the content at the distraction point in the video module and in response to the determining the distraction event, wherein the checkpoint question tests the viewer's knowledge of the content;
 presenting, by the computing device, the checkpoint question to the viewer during the viewing session;
 generating, by the computing device, classification data associated with timestamp data of the video module for portions of the video module and saving the classification data and timestamp data in the video classification repository, wherein the classification data is based on an analysis of content and context of the portions of the video module, wherein the content of the video module is determined by the computing device based on the classification data;
 accessing, by the computing device, historic distraction data;
 determining, by the computing device, that the viewer is likely to be distracted based on a comparison of the historic distraction data and the content of the video module, wherein the determining the distraction event at the distraction point in the video module comprises determining a predicted distraction event; and presenting, by the computing device, the checkpoint questions to the user immediately prior to the distraction point in the video module.

2. The computer-implemented method of claim 1, further comprising receiving, by the computing device, real-time feedback data from the user computer system indicating a level of attention of the viewer with respect to the video module, wherein the determining the distraction event is based on the real-time feedback data.

3. The computer-implemented method of claim 1, further comprising:
accessing, by the computing device, historic distraction data; and
determining, by the computing device, that the viewer is likely to be distracted based on a comparison of the historic distraction data and the content of the video module, wherein the determining the distraction event comprises determining a predicted distraction event.

4. The computer-implemented method of claim 3, further comprising: generating, by the computing device, the historic distraction data based on an analysis of historic video module viewing sessions of the viewer, wherein the historic distraction data indicates contextual situations in which the viewer is likely to be distracted.

5. The computer-implemented method of claim 1, wherein the computing device generates the classification data during the viewing session.

6. A computer program product comprising a computer readable storage medium having program instructions embodied therewith, the program instructions executable by a computing device to cause the computing device to:
generate a distraction profile for a viewer based on an analysis of a history of video watching of the viewer, the distraction profile including distraction data indicating when attention of the viewer has wandered from video content;
initiate a viewing session of a video module at a user computer system;
determine content and context of the video module;
comparing the content and context in the distraction profile of the user with the content and context of the video module;
determine, based on the comparing, one or more distraction points in the video module where the viewer is likely to become distracted; and
present one or more checkpoint questions directed to content of the video module associated with the one or more distraction points to the viewer during in the viewing session, wherein the one or more checkpoint questions are configured to assist the viewer in staying focused on the video module during the viewing session.

7. The computer program product of claim 6, wherein the program instructions further cause the computing device to dynamically generate the one or more checkpoint questions based on content and context of the one or more respective distraction points of the video module.

8. The computer program product of claim 6, wherein the program instructions further cause the computing device to receive real-time feedback data from the user computer system indicating a level of attention of the viewer with respect to the video module, wherein the determining the one or more distraction points is also based on the real-time feedback data.

9. The computer program product of claim 6, wherein the program instructions further cause the computing device to generate the distraction profile for the viewer based on an analysis of historic video module viewing sessions of the viewer, wherein the distraction profile for the viewer indicates contextual situations in which the viewer is likely to be distracted.

10. The computer program product of claim 6, wherein the program instructions further cause the computing device to generate classification data associated with timestamp data of the video module for portions of the video module, wherein the classification data is based on the determined content and context of the video module, and wherein the one or more checkpoint questions are determined based on the classification data.

11. The computer program product of claim 10, wherein the classification data is generated during the viewing session.

12. A system comprising:
a processor, a computer readable memory and a computer readable storage medium associated with a computing device;
program instructions to generate a distraction profile for a viewer based on an analysis of a history of video watching of the viewer, the distraction profile including distraction data indicating when attention of the viewer has wandered from video content;
program instructions to initiate a viewing session of a video module at a user computer system;
program instructions to determine content and context of the video module;
program instructions to compare content and context in the distraction profile of the user with the content and context of the video module;
program instructions to determine, based on the comparing, one or more distraction points in the video module where the viewer is likely to become distracted;
program instructions to present one or more checkpoint questions directed to content of the video module associated with the one or more distraction points to the viewer during the viewing session, wherein the one or more checkpoint questions are configured to assist the viewer in staying focused on the video module during the viewing session, and wherein the program instructions are stored on the computer readable storage medium for execution by the processor via the computer readable memory.

13. The system of claim 12, wherein the portion of the video module is presented to the viewer immediately prior to the presenting the checkpoint question to the viewer.

14. The system of claim 12, further comprising program instructions to receive real-time feedback data from the user computer system indicating a level of attention of the viewer with respect to the video module, wherein the determining the the one or more distraction points in the video module is based on the real-time feedback data.

15. The system of claim 12, further comprising:
program instructions to access the distraction profile for the viewer in a data store,
wherein the determining the one or more distraction points comprises determining one or more predicted distraction events.

16. The system of claim 15, wherein the distraction profile indicates contextual situations in which the viewer is likely to be distracted.

17. The system of claim 12, further comprising program instructions to initiate replaying of the portion of the video module to the viewer based on a viewer response to the one or more checkpoint questions.

18. The system of claim 17, further comprising program instructions to issue a notification to the viewer indicating that an incorrect response to the one or more checkpoint questions was received.

\* \* \* \* \*